(12) United States Patent
Burba et al.

(10) Patent No.: US 9,746,933 B2
(45) Date of Patent: Aug. 29, 2017

(54) SYSTEMS AND METHODS FOR NATURAL MOTION INTERACTION WITH A VIRTUAL ENVIRONMENT

(71) Applicant: Survios, Inc., Culver City, CA (US)

(72) Inventors: Nathan Burba, Culver City, CA (US); Joseph Choi, Culver City, CA (US); Timothy Irving, Culver City, CA (US); Marc Webster, Culver City, CA (US); Umez Liauwala, Culver City, CA (US)

(73) Assignee: Survios, Inc., Culver City, CA (US)

(*) Notice: Subject to any disclaimer, the term of this patent is extended or adjusted under 35 U.S.C. 154(b) by 0 days.

(21) Appl. No.: 15/152,035

(22) Filed: May 11, 2016

(65) Prior Publication Data

US 2016/0342218 A1    Nov. 24, 2016

Related U.S. Application Data

(60) Provisional application No. 62/164,329, filed on May 20, 2015.

(51) Int. Cl.

| G09G 5/00 | (2006.01) |
|---|---|
| G06F 3/01 | (2006.01) |
| G06F 3/0338 | (2013.01) |
| G06F 3/0346 | (2013.01) |
| A63F 13/20 | (2014.01) |

(52) U.S. Cl.
CPC ............. *G06F 3/017* (2013.01); *A63F 13/20* (2014.09); *G06F 3/016* (2013.01); *G06F 3/0338* (2013.01); *G06F 3/0346* (2013.01)

(58) Field of Classification Search
CPC ........................................ G06F 3/017
USPC ........................................ 345/156
See application file for complete search history.

(56) References Cited

U.S. PATENT DOCUMENTS

| 2002/0110789 A1* | 8/2002 | Karussi | G09B 19/16 434/62 |
|---|---|---|---|
| 2002/0128064 A1* | 9/2002 | Sobota | A63F 13/06 463/37 |
| 2010/0009752 A1* | 1/2010 | Rubin | A63F 13/06 463/36 |
| 2012/0302347 A1* | 11/2012 | Nicholson | A63F 13/06 463/37 |
| 2013/0009907 A1* | 1/2013 | Rosenberg | G06F 3/046 345/174 |
| 2013/0116958 A1* | 5/2013 | Kristensson | H04B 5/0075 702/85 |

(Continued)

*Primary Examiner* — Jason Olson
(74) *Attorney, Agent, or Firm* — Jeffrey Schox; Thomas Gwinn

(57) ABSTRACT

A system includes a hand controller that includes a rigid ergonomic chassis; a hand strap, coupled to the right side of the ergonomic chassis; a main trigger, configured such that the main trigger is operable by an index finger of the right hand; a lower lever, fixed to the front of the rigid ergonomic chassis and below the main trigger, configured such that the lower lever is actuated by contraction of any of a middle finger, a ring finger, and a pinky finger of the right hand; a joystick, configured such that the joystick is operable by a thumb of the right hand; a tracking module that enables tracking of a position and orientation of the hand controller; and a wireless communication module.

17 Claims, 6 Drawing Sheets

(56) References Cited

U.S. PATENT DOCUMENTS

| | | | |
|---|---|---|---|
| 2014/0266160 A1* | 9/2014 | Coza | G01B 7/003 |
| | | | 324/207.11 |
| 2015/0238855 A1* | 8/2015 | Uy | G06F 3/0338 |
| | | | 463/37 |
| 2016/0132114 A1* | 5/2016 | Rihn | G06F 3/016 |
| | | | 345/156 |
| 2016/0151706 A1* | 6/2016 | Antonio | A63F 13/98 |
| | | | 463/37 |

\* cited by examiner

FIGURE 2B FIGURE 2C FIGURE 2D

SYSTEMS AND METHODS FOR NATURAL MOTION INTERACTION WITH A VIRTUAL ENVIRONMENT

CROSS-REFERENCE TO RELATED APPLICATIONS

This application claims the benefit of U.S. Provisional Application No. 62/164,329, filed 20 May 2015, which is incorporated in its entirety by this reference.

TECHNICAL FIELD

This invention relates generally to the virtual reality field, and more specifically to new and useful systems and methods for natural motion interaction with a virtual environment.

BACKGROUND

It was the early 1990s, and virtual reality (VR) had arrived. VR gaming systems populated arcades and movie theaters across the country; IBM announced Project Elysium, a "complete integrated VR workstation" for use by architects and builders. At the time, VR seemed poised to be the next big thing in computing. Unfortunately, the complex controls and underwhelming graphics of 90's VR systems prevented virtual reality from living up to its full potential, and the 'VR revolution' quickly fizzled out.

Over twenty years later, virtual reality is back in a big way. Soon, consumer VR hardware will be able to display virtual worlds so detailed that they are almost indistinguishable from reality. Yet, for all the progress that has been made in VR, the systems and methods used to enable interaction with these virtual worlds bear a striking resemblance to those of 1991.

For a virtual environment to be truly immersive, manipulation of that environment must be natural and intuitive. Thus, there exists a need in the virtual reality field to create new and useful systems and methods for natural motion interaction with a virtual environment. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Natural Motion Interaction

Figure 1:
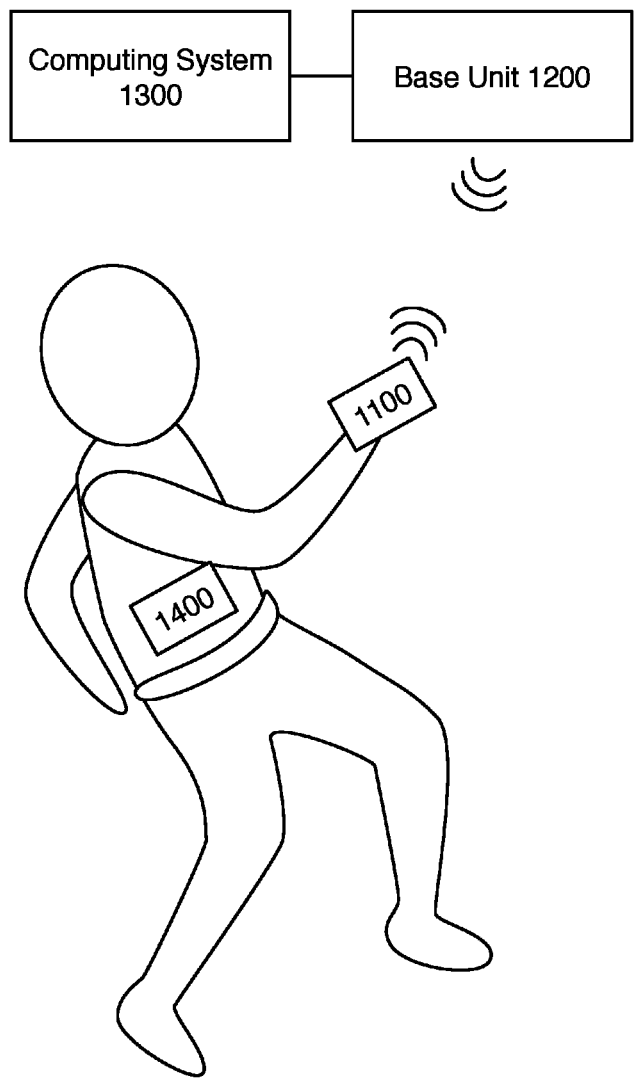
FIG. 1 is a schematic representation of a system of a preferred embodiment.

A system 1000 for natural motion interaction includes hand controllers 1100, a base unit 1200, and a computing system 1300, as shown in FIG. 1. The system 1000 may additionally include body trackers 1400.

The system 1000 functions to enable natural motion interaction by precisely tracking position and orientation of a user's hands as determined at least in part based on the position and orientation of hand controllers 1100. These position and orientation values, tracked over time, are then converted into motions and/or gestures by the computing system 1300 (potentially via the base unit 1200). Additional positions/orientations may be determined based on additional body trackers 1400; for example, the position and orientation of a user's head may be determined by a body tracker 1400 located on a head-mounted display (HMD).

Accurately tracking hand position and orientation is only a piece of the natural motion interaction puzzle. Ideally, the hand controllers 1100 are constructed with a simple control scheme that allows for effective manipulation of the virtual environment while still preserving immersion. By modeling the control scheme after common real-world interactions (e.g., grabbing, touching, holding, etc.), the hand controllers 1100 can effectively strike this balance.

Likewise, software of the computing system 1300 is preferably designed to interpret hand tracking motion to take advantage of natural motion; for example, a user may chamber a round in a virtual shotgun by moving his or her hands in imitation of the timeless shotgun slide pump, or pull an arrow from a quiver by reaching behind his or her back.

Further, translation of hand position and orientation may be performed in an intelligent manner that takes into account the context of the virtual environment, e.g., as described in U.S. Provisional Application No. 62/175,759, the entirety of which is incorporated by this reference.

The immersive effect of natural motion interaction is solidified by feedback. The computing system 1300 may supply (or couple to another system capable of supplying) an audiovisual experience that makes interaction feel real. Potentially just as important as audiovisual feedback, though, is tactile feedback. Much of it is provided by the presence of the hand controllers 1100, but tactile feedback may be even further enhanced through the use of haptic technology (e.g., using haptic feedback actuators of a hand controller 1100 to simulate the recoil of a pistol shot).

The system 1000 is preferably used in combination with a virtual reality computing system, but may additionally or alternatively be used with any suitable computing system, including augmented reality computing systems. As a more specific example, the system 1000 may be used to control a mechanical system; for example, the system 1000 may be used to enable a user to manipulate a real-world robotic arm.

The hand controller 1100, as shown in FIGS. 2A-2D and FIG. 3, serves as the primary method for user interfacing with the system 1000. The hand controller 1100 preferably includes an ergonomic chassis 1110, input controls 1120, a tracking module 1130, a battery 1140, a power interface 1150, and a communication module 1160. The hand controller 1100 may additionally include a haptic feedback module 1170.

The ergonomic chassis 1110 functions to provide structural stability to the hand controller 1100 and to enable the hand controller 1100 to couple to a user's hand. The other components of the hand controller 1100 are preferably mounted to or in the ergonomic chassis 1110. Additionally or alternatively, components of the hand controller 1100 may be distributed, mounted, and/or positioned in any manner.

The ergonomic chassis 1110 preferably comprises a rigid two-part shell formed of plastic; additionally or alternatively, the ergonomic chassis 1110 may be any suitable structure formed of any suitable material. For example, the ergonomic chassis 1110 may comprise a metal shell with rubber grips exterior to the shell. The ergonomic chassis 1110 is preferably rigid, but may additionally or alternatively be flexible or partially flexible.

The ergonomic chassis 1110 preferably includes mounting points (e.g., threaded screw holes) for the components of the hand controller 1100; additionally or alternatively, components of the hand controller 1100 may be coupled to the ergonomic chassis 1110 in any suitable way (e.g., glued).

The ergonomic chassis 1110 is preferably shaped in a manner that enables the chassis 1110 to be gripped comfortably in the palm of a single hand while still enabling the use of a user's fingers (e.g., for pushing buttons). For example, the ergonomic chassis 1110 may be constructed approximately in the shape of an elliptic cylinder, modified with cutouts or other structural changes to ensure ergonomic placement of input controls (and other features). Additionally or alternatively, the ergonomic chassis 1110 may be constructed in any suitable shape.

Figure 4:
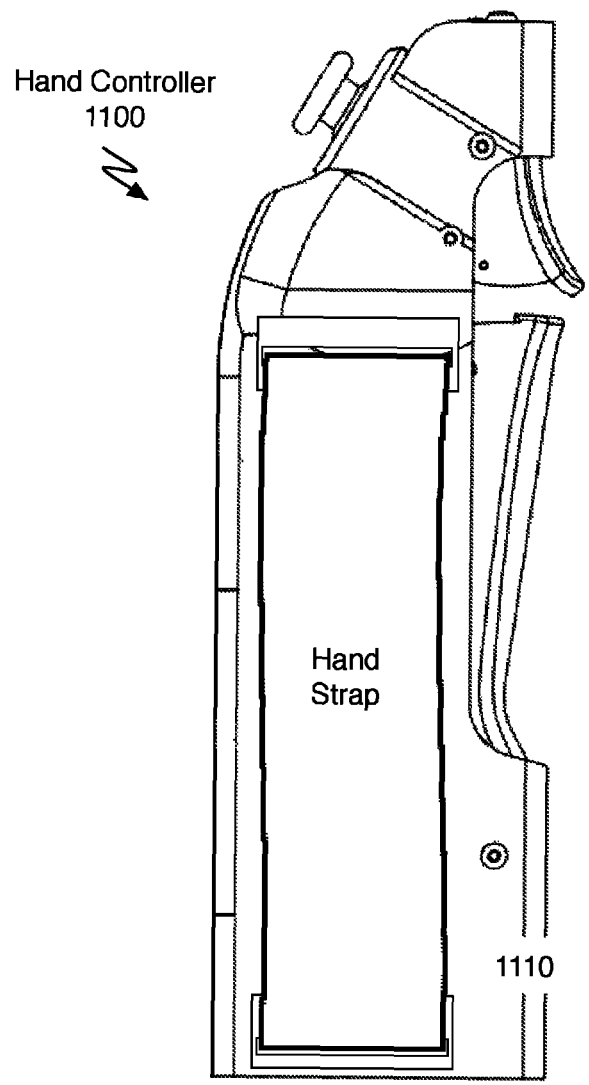
FIG. 4 is a diagram view of a hand controller of a system of a preferred embodiment.

In one implementation of a preferred embodiment, the ergonomic chassis 1110 includes a hand strap, as shown in FIG. 4. The hand strap preferably enables the ergonomic chassis 1110 to remain in a user's hand even if the user is not actively gripping the hand controller 1100. This aspect of the hand strap may enable the controller 1100 to simulate the feeling of 'grip' for holding objects in conjunction with the lower lever (described below).

The hand strap is preferably configured so that it straps around the back of a user's hand (allowing the palm to come into contact with the ergonomic chassis 1110); thus, for a right-handed controller 1100 the hand strap is preferably on the right-hand side (as viewed from the back of the controller) and for a left-handed controller 1100 the hand strap is preferably on the left-hand side (as viewed from the back of the controller). Additionally or alternatively, the hand strap may strap on a user's hand in any manner.

The hand strap is preferably an adjustable hand strap secured by Velcro, but may additionally or alternatively be any suitable adjustable hand strap (e.g., one adjustable via an elastic band) or a non-adjustable hand strap.

The hand strap is preferably removable from the hand controller 1100, but may additionally or alternatively be fixed to the hand controller 1100.

In a variation of a preferred embodiment, the hand controller 1100 may couple to a user's hand in an alternative manner (e.g., via a rigid plastic brace, via magnetic coupling, etc.).

Figure 2:
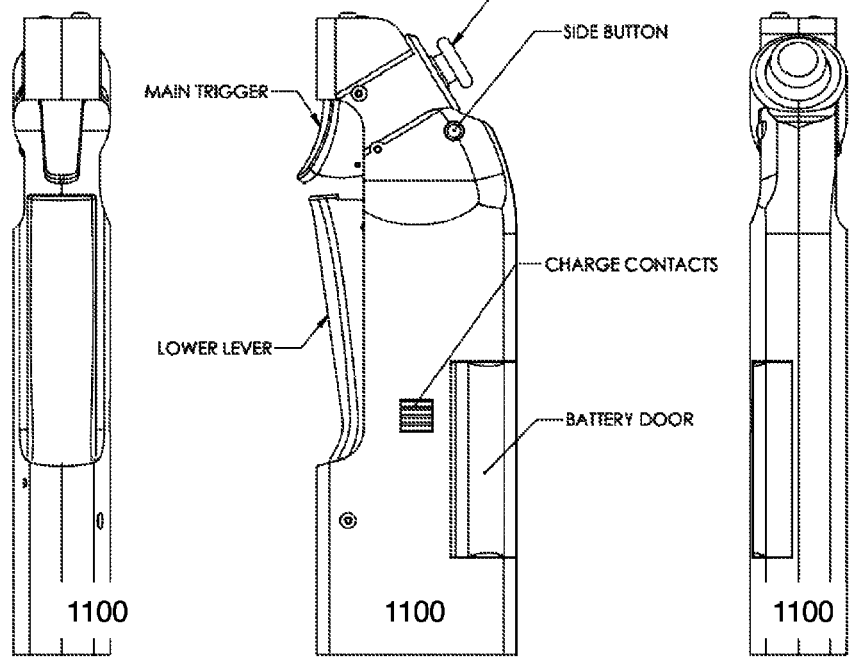
FIG. 2A is a top view of a hand controller of a system of a preferred embodiment.
FIG. 2B is a front view of a hand controller of a system of a preferred embodiment.
FIG. 2C is a side view of a hand controller of a system of a preferred embodiment.
FIG. 2D is a back view of a hand controller of a system of a preferred embodiment.
Figure 3:
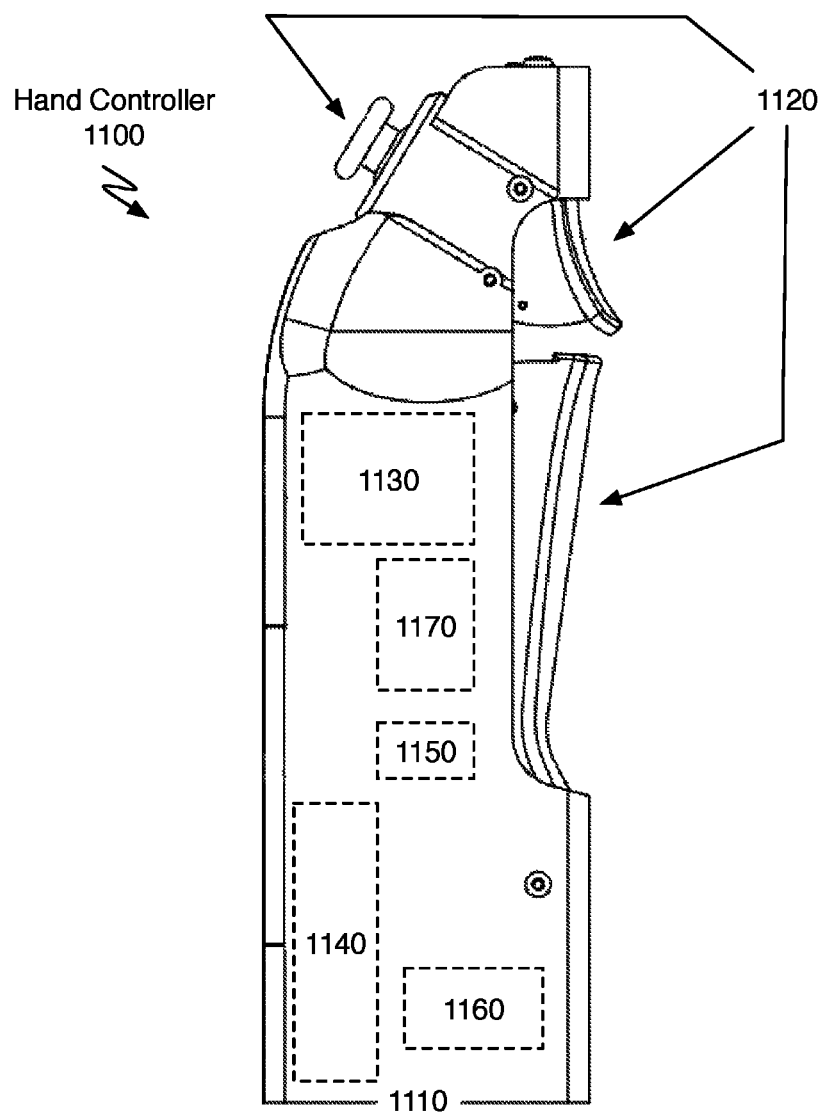
FIG. 3 is a diagram view of a hand controller of a system of a preferred embodiment.

The ergonomic chassis 1110 is preferably designed such that input controls 1120 of the hand controller 1100 are positioned in easily accessible locations, as shown in FIG. 3. Further, the ergonomic chassis 1110 is preferably designed to be held in a particular hand; for example, the side button of FIG. 2C is preferably easily accessible by the thumb (meaning that the view of FIG. 2C is that of a right-handed controller). Additionally or alternatively, the hand controller 1100 may be handedness agnostic (i.e., not designed to be held in a particular hand).

The input controls 1120 function to allow a user to provide input to the system 1000 supplementary to motion input (i.e., input derived from motion or position/orientation of the hand controller 1100). The input controls 1120 preferably comprise buttons or other input devices (e.g., joysticks, touchpads, trackballs, etc.).

The input controls 1120 are preferably fixed to the ergonomic chassis 1110, but may additionally or alternatively be removably coupled to the ergonomic chassis 1110 or coupled to the hand controller 1100 in any suitable manner.

The input controls 1120 preferably include a power button, a joystick, a side button, a main trigger, and a lower lever, as shown in FIGS. 2A-2D, but may additionally or alternatively include any set of suitable input controls.

The power button is preferably positioned at the top of the hand controller 1100, and functions to control power of the hand controller 1100 (and/or the system woo). The power button is preferably a binary push button; that is, the button is pushed to activate, and only two states are recognized (depressed or not). Additionally or alternatively, the power button may be positioned in any suitable location and may be actuated in any suitable manner.

The joystick is preferably positioned at the top-back of the hand controller 1100, such that when the controller 1100 is gripped the user's thumb is positioned over the joystick (e.g., when a user's hand is held in a 'thumbs up' configuration). Additionally or alternatively, the joystick may be positioned in any suitable location. The joystick preferably enables the user's thumb to provide directional input (e.g., to navigate a character throughout a virtual world), but may additionally or alternatively be used for any suitable purpose.

The joystick is preferably an analog joystick; that is, there is preferably a large number of directional states for the joystick (e.g., output of the joystick varies substantially continuously as the joystick is moved). Additionally or alternatively, the joystick may have a small number of directional states (e.g., only left, right, up, and down) similar to a d-pad.

The joystick is preferably depressable; that is, pressing on the joystick actuates a button under the joystick that may be used for additional input. Additionally or alternatively, the joystick may not be depressable.

The side button is preferably positioned on a side of the hand controller 1100 below the joystick. The side button is preferably positioned on the left side for a right-handed controller (as viewed from behind) and on the right side for a left-handed controller (as viewed from behind). The side button is preferably positioned such that a user's thumb may be moved from the joystick to the side button without changing grip on the hand controller 1100. Additionally or alternatively, the side button may be positioned in any suitable location.

The side button is preferably a binary push button; that is, the button is pushed to activate, and only two states are recognized (depressed or not). Additionally or alternatively, the side button may be actuated in any suitable manner and input data may be collected in any suitable manner (e.g., side button input may vary based on actuation pressure).

The main trigger is preferably positioned at the front of the hand controller 1100, such that a user's index finger rests on the main trigger when the hand controller 1100 is gripped. Additionally or alternatively, the main trigger may be positioned in any suitable location. The main trigger is preferably actuated by a user squeezing his or her index finger, but may additionally or alternatively be actuated in any suitable manner (e.g., by a user squeezing a middle finger).

The main trigger is preferably an analog trigger; that is, the output of the main trigger preferably varies continuously (or has a large number of discrete states) throughout the actuation arc of the trigger. Additionally or alternatively, the output of the main trigger may be discrete (e.g., the trigger is either in a depressed state or not).

The lower lever is preferably located below the main trigger such that a user's fingers (aside from the index finger) rest on the lower lever when the hand controller 1100 is gripped. Additionally or alternatively, the lower lever may be positioned in any suitable location. The lower lever is preferably actuated by a user squeezing his or her fingers (aside from the index finger), but may additionally or alternatively be actuated in any suitable manner. The lower lever preferably serves as an indication of grip; for example, the lower lever may be used to allow a user to 'hold' objects within a virtual world (while releasing the lower lever may result in dropping the virtual objects) when grip exceeds some minimum threshold. The extent to which the lower lever is actuated (or the pressure on the lower lever, or any other suitable metric) may be used to estimate grip force or grip strength of a user, which may in turn be used to determine some result in a virtual environment. For example, a user's avatar may be able to hold onto a virtual object only if grip force or strength exceeds a threshold.

The lower lever is preferably an analog lever; that is, the output of the lower lever preferably varies continuously (or has a large number of discrete states) throughout the actuation arc of the lever. Additionally or alternatively, the output of the lower lever may be discrete (e.g., the lever is either in a depressed state or not).

Figure 5:
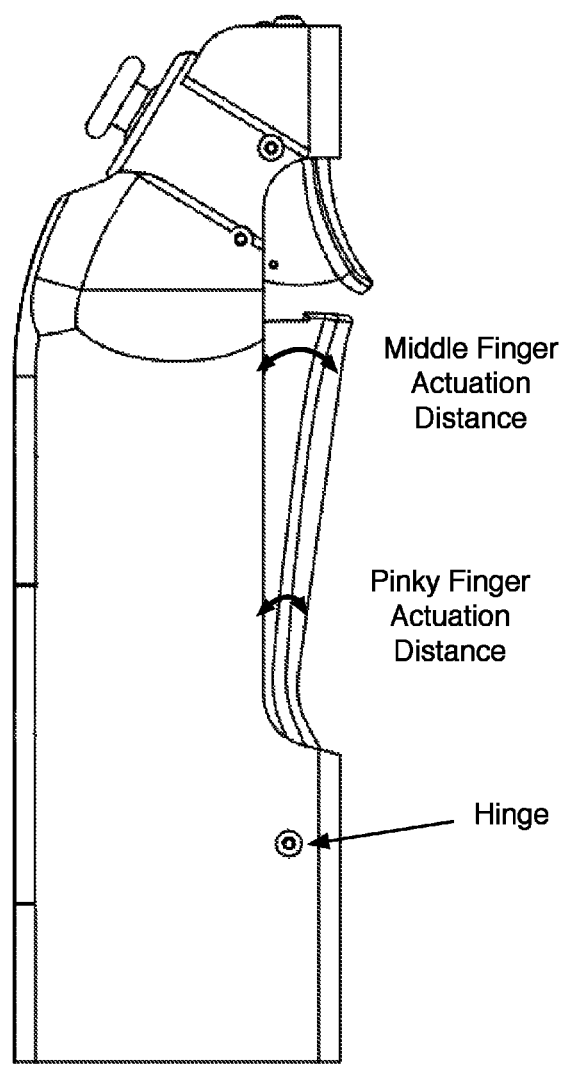
FIG. 5 is a diagram view of a hand controller of a system of a preferred embodiment.

In one implementation of a preferred embodiment, the lower lever is hinged at the bottom of the lever, as shown in FIG. 5. One consequence of this (given proper configuration of the lower lever) may be that the actuation distance decreases along the length of the lever; that is, the actuation distance for the pinky finger is smaller than for the ring finger, which is in turn smaller than for the middle finger. This may enable the lower trigger to be actuated more consistently without sympathetic actuation of the main trigger by a user's index finger and/or may more accurately simulate the feeling of grip.

The tracking module 1130 functions to enable tracking of the position and orientation of the hand controller 1100.

Position and orientation of the hand controller 1100 are preferably tracked relative to a reference point invariant to user movement (e.g., the center of a living room) but may additionally or alternatively be tracked relative to the user (or any other suitable reference point).

The tracking module 1130 preferably enables position and orientation tracking through the use of magnetic position sensing, but may additionally or alternatively include position and orientation tracking through any suitable manner; for example, internal optical tracking (e.g., tracking position based on visual cues using a camera located within the hand controller 1100), external optical tracking (e.g., tracking position based on visual detection of the hand controller 1100 by a camera external to the hand controller 1100), tracking via GPS, and/or tracking via IMU (discussed in more detail below).

Exemplary implementations of magnetic position sensing are described in U.S. Pat. No. 4,737,794, the entirety of which is incorporated by reference.

The tracking module 1130 preferably includes a set of orthogonal magnetic sensing coils designed to sense a magnetic field instantiated by the system 1000; additionally or alternatively, the tracking module 1130 may include any suitable magnetic position/orientation sensors.

The sensed magnetic field information generated by the tracking module 1130 is preferably passed to the computing system 1300, which computes position and orientation based on the sensed magnetic field information. Additionally or alternatively, magnetic field information sensed by the tracking module 1130 may be converted by the tracking module 1130 to position/orientation information before being communicated to the computing system 1300.

In a variation of a preferred embodiment, the tracking module 1130 includes both magnetic sensing coils and an inertial measurement unit (IMU). The IMU may include accelerometers and/or gyroscopes that record orientation and/or motion of the hand controller 1100. IMU data is preferably used to supplement magnetic tracking data; for example, IMU data may be sampled more regularly than magnetic tracking data (allowing for motion between magnetic tracking sample intervals to be interpolated more accurately). As another example, IMU data may be used to correct or to provide checks on magnetic tracking data; for example, if IMU data does not record a change in orientation, but magnetic tracking does, this may be due to a disturbance in magnetic field (as opposed to a change in orientation of the hand controller 1100).

In another variation of a preferred embodiment, magnetic tracking data is supplemented by external visual tracking; that is, the position and/or orientation of the hand controller 1100 is tracked by an external camera. Similarly to IMU data, external visual tracking data may be used to supplement, correct, and/or verify magnetic tracking data.

The battery 1140 functions to provide power to the hand controller 1100. The battery 1140 is preferably a rechargeable lithium-ion battery, but may additionally or alternatively be any suitable energy storage device (e.g., alkaline battery, supercapacitor, fuel cell, Mr. Fusion nuclear reactor).

The battery 1140 is preferably removable from the ergonomic chassis 1110, but may additionally or alternatively be fixed to the ergonomic chassis 1110.

The power interface 1150 functions to charge the battery 1140 while the battery 1140 is coupled to the hand controller 1100. The power interface 1150 preferably comprises a set of conductive contacts exposed to the outside of the ergonomic chassis 1110 such that the hand controller 1100 may be charged when docked with a power source. Additionally or alternatively, the power interface 1150 may comprise any suitable power interface; for example, the power interface 1150 may comprise a inductive and/or capacitive charging circuit that enables wireless charging of the battery 1140).

In a variation of a preferred embodiment, the power interface 1150 may be used to power the hand controller 1100 directly (e.g., the hand controller 1100 may be coupled to wall power or an external battery via the power interface 1150).

The communication module 1160 functions to allow the communication of data collected by the hand controller 1100 with the system 1000. The communication module 1160 preferably comprises a wireless transceiver (e.g., Bluetooth, Wi-Fi, RF, etc.) but may additionally or alternatively comprise any suitable communication module.

The communication module 1160 may additionally be used to allow communication from the system 1000 to the hand controller 1100 (e.g., actuation of the haptic feedback module 1170, firmware updates, etc.).

The communication module 1160 preferably communicates with a corresponding communication module of the base unit 1200, but may additionally or alternatively communicate directly with the computing system 1300 and/or any other suitable communication device.

In a variation of a preferred embodiment, the communication module 1160 includes a wired interface that enables communication over an electrically conductive cable. The wired interface may be integrated with the power interface 1150 (such a cable connected between the hand controller 1100 and an external location such as the base unit 1200 may be used for both power and communication purposes).

The haptic feedback module 1170 functions to provide tactile feedback to a user holding the hand controller 1100. The haptic feedback module 1170 may include any suitable haptic feedback component, e.g., vibratory motors, electroactive polymers, piezoelectric actuators, electrostatic actuators, subsonic audio wave surface actuators, and/or reverse-electrovibration actuators. The haptic feedback module 1170 is preferably controlled in response to data transmitted from the system 1000 to the hand controller 1100, but may additionally or alternatively be controlled by the hand controller 1100 internally. For example, the haptic feedback module 1170 may provide tactile feedback in response to actuation of input controls 1120. As another example, the haptic feedback module 1170 may provide feedback to a user wherein the magnitude of the feedback is determined by the grip strength of the user (or other actuation of the lower lever of the controller 1100); gripping the controller 1100 harder may result in stronger feedback.

Figure 6:
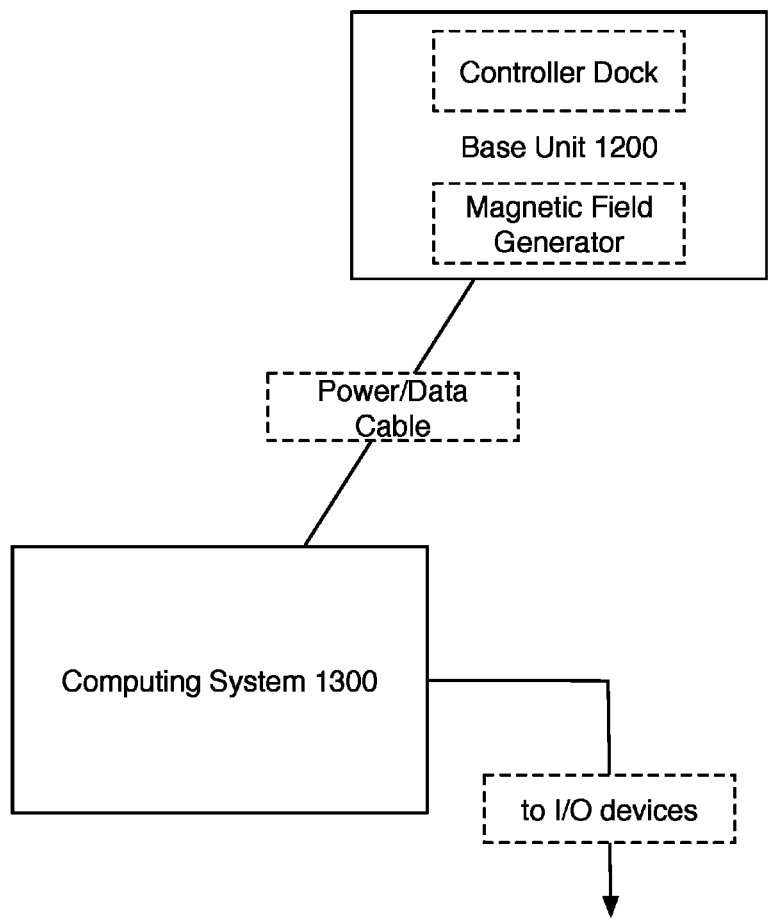
FIG. 6 is a diagram view of a base unit of a system of a preferred embodiment.

The base unit 1200, as shown in FIG. 6, functions to enable tracking of the hand controllers 1100. The base unit 1200 preferably generates the magnetic field sensed by the hand controllers 1100 to determine position/orientation. The base unit 1200 preferably includes a magnetic field generating coil controlled by the computing system 1300; additionally or alternatively, the magnetic field generating coil of the base unit 1200 may operate independently of computing system 1300 input.

The base unit 1200 may additionally include other hand controller tracking mechanisms; for example, the base unit 1200 may include cameras (e.g., RGB cameras, structured light depth cameras, etc.) used to provide external optical tracking of the user and/or hand controllers 1100.

The base unit 1200 may additionally provide a charging interface for the hand controllers 1100; for example, the base unit 1200 may include a charging circuit connected to a hand controller dock. When hand controllers 1100 are placed within the dock, they may be charged by the base unit 1200 (e.g., via conductive contacts in mechanical contact with a power interface 1150 of the hand controller 1100, or via inductive charging, etc.)

A hand controller docking interface of the base unit 1200 may additionally or alternatively be used for hand controller 1100 calibration (e.g., hand controller 1100 position as sensed by magnetic tracking modules of the hand controller 1100 may be calibrated to a known position when placed in the dock).

In a variation of a preferred embodiment, the base unit 1200 does not include a magnetic field generating coil. For example, a magnetic field generating coil may be located on a backpack worn by a user (allowing tracking of the hand controllers 1100 relative to the user).

The base unit 1200 is preferably communicatively coupled to the computing system 1300 via a cable, but may additionally or alternatively be communicatively coupled to the computing system in any suitable manner (or may be not communicatively coupled to the computing system 1300)

The computing system 1300 functions to process user interaction with the system woo. The computing system 1300 preferably receives interaction data from the hand controllers 1100 and processes this interaction data into input that may be applied to a virtual environment (or to an augmented environment, or to an external actuator, etc.).

Interaction data received by the computing system preferably includes position and orientation data of the hand controllers 1100. Position and orientation data received by the computing system 1300 is preferably transmitted as raw sensor data (e.g., magnetic field data as sensed by the hand controllers 1100) but may additionally or alternatively be transmitted as processed data (e.g., position/orientation of hand controllers as determined by the hand controllers 1100).

If multiple sensing methods are used by the system 1000, the computing system 1300 preferably functions to perform sensor fusion (e.g., supplementing magnetic position data with IMU data as previously described).

Interaction data may additionally or alternatively include any other user interaction data; for example, interaction data may include input data as sensed by the input controls 1120 (e.g., button actuations, joystick position), visual data (as sensed by a camera of the base unit 1200 or by any other external camera), and/or IMU data from the hand controllers 1100.

The computing system 1300 preferably translates interaction data into natural motion input. For example, the computing system 1300 preferably recognizes motions of the hand controllers 1100 in context of a virtual environment (e.g., interpreting user hand movement as chambering a shotgun round).

The computing system 1300 is preferably a general-purpose computer including processors, memory, and input/output capability but may additionally or alternatively be any suitable electronic device capable of performing the described functions of the computing system 1300.

In the example use case of a virtual reality immersion platform, the computing system 1300 may be implemented as part of a computing system that generates a virtual world for user interaction (e.g., the computing system 1300 may be part of a VR gaming system including audio output, video output to a head-mounted display, that is capable of running VR software, etc.). The computing system 1300 may additionally or alternatively include any suitable mechanism for providing feedback to a user (e.g., LEDs indicating equipment status, or providing information about the virtual world etc.)

The body trackers 1400 serve as additional position and/or orientation trackers used by the system 1000 to track positions and orientations in addition to those of the hand controller 1100. For example, a body tracker 1400 may be used to track position and orientation of a user's head or torso. Body trackers 1400 preferably include tracking modules substantially similar to those of the hand controller 1100, but may additionally or alternatively include any suitable tracking module. For example, a body tracker 1400 may include an infrared LED (which can be tracked by an infrared camera of the base unit 1200 or other infrared camera).

Body trackers 1400 preferably also include a battery and a communication module substantially similar to those used in the hand controller 1100, but may additionally or alternatively use any suitable battery and/or communication modules.

In a variation of a preferred embodiment, body trackers 1400 are passive trackers (and may not require battery and/or communication module). For example, a body tracker

1400 may comprise a passive RFID tag actuated by a tag reader (potentially in the base unit 1200).

Body tracker data may be used to correct, calibrate, or otherwise modify hand controller tracking data. For example, if the body tracker 1400 contains an IMU and the hand controller 1100 does not, IMU data of the body tracker may be used to supplement magnetic tracking data; for example, IMU data may be sampled more regularly than magnetic tracking data (allowing for motion between magnetic tracking sample intervals to be interpolated more accurately). As another example, IMU data may be used to correct or to provide checks on magnetic tracking data; for example, if IMU data does not record a change in orientation, but magnetic tracking does, this may be due to a disturbance in magnetic field.

As another example, the body tracker 1400 may contain a magnetic tracking module, and may be used to correct, calibrate, or otherwise modify hand controller tracking data. For example, if both the body tracker 1400 and the hand controller 1100 record a substantial shift in magnetic field readings simultaneously, this may be indicative of a time-dependent fluctuation of the magnetic field generated by the magnetic field generator.

As a third example, the body tracker 1400 may contain an IMU supplementary to an IMU contained within the hand controller 1100; in this example, the IMU of the body tracker may be used to differentiate between motion of the hand controller 1100 due to whole body movement versus motion of the hand controller 1100 due to arm or wrist movements.

2. Magnetic Field Correction

Magnetic fields generated by magnetic field tracking systems (such as those of the system woo) are potentially susceptible to field distortions (especially due to the presence of large conductive objects, in which projected magnetic fields may induce eddy currents).

Magnetic tracking may be progressively corrected in response to magnetic field distortions through use of alternative tracking methods. For example, a magnetic tracking system may be calibrated by tracking a user with a visual tracking system as the user moves around a room (and correlating position as determined by the visual tracking system with magnetic field as sensed by the magnetic tracking system).

This correlation may be performed once (e.g., initial calibration), periodically, or in real-time. For example, magnetic field calibration may occur once every week. Additionally or alternatively, magnetic field calibration may be performed in response to user input or to out-of-threshold sensor values (e.g., upon detection of higher-than-expected magnetic field, or detection of high magnetic field time gradient).

In one implementation, a method for correcting magnetic tracking data includes calculating initial position data and correcting the initial position data according to a correction transform. The method functions to enable the generation of corrected position and/or orientation data for an object or entity coupled to a magnetic tracker and tracked by a magnetic tracking system (e.g., using a secondary tracking system). The secondary tracking system preferably includes a visual tracking system, but may additionally or alternatively include any suitable system capable of tracking the entity or object coupled to the magnetic tracking system.

The correction transform functions to define a transformation for the initial position data (e.g., the magnetic data) based on additional data captured (e.g., historical data, data from a secondary capture system, etc.) The correction transform may additionally need to be updated or otherwise modified to account for changing magnetic field distortions.

Magnetic field distortions in the magnetic field generator may occur for a number of reasons. For example, magnetic field distortion may arise from field generator non-idealities, field sensor non-idealities, local interference (e.g., distortions in the magnetic field due to electronics present in the system performing magnetic field tracking), and environmental interference (e.g., distortions in the magnetic field due to other factors, like metal in walls). The distortion contributions from these sources may likewise vary for a number of reasons; for example, field generator non-idealities may vary with field oscillation frequency, local interference may vary with power consumption characteristics of nearby electronics, and environmental interference may vary with the presence and/or positions of persons or other objects within a generated magnetic field.

Resultantly, it may be desired to monitor indicators corresponding to these distortion sources to determine if a correction transform needs to be modified or replaced.

More examples of calibration and correction may be found in U.S. Provisional Application No. 62/303,131, the entirety of which is incorporated by this reference.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for natural motion interaction. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for natural motion interaction with a virtual environment comprises:
   a hand controller, configured to be held in a right hand of a user, the hand controller comprising:
   a rigid ergonomic chassis comprising a front, a back, a right face, a left face, and a bottom;
   a hand strap, coupled to the right face of the ergonomic chassis, configured to strap to the back of the right hand, such that the ergonomic chassis remains coupled to the right hand when strapped regardless of user hand configuration;
   a main trigger, fixed to the front of the rigid ergonomic chassis, configured such that the main trigger is operable by an index finger of the right hand;
   a lower lever, fixed to the front of the rigid ergonomic chassis and below the main trigger;
   a joystick, fixed to the back of the rigid ergonomic chassis, configured such that the joystick is operable by a thumb of the right hand;
   a tracking module, fixed to the rigid ergonomic chassis, that enables tracking of a position and orientation of the hand controller;

a wireless communication module, fixed to the rigid ergonomic chassis, that transmits input control data responsive to input of the user at the main trigger, the lower lever, and the joystick; and a base unit, the base unit physically distinct from the hand controller and including a magnetic field generator;

wherein the tracking module comprises a set of orthogonal magnetic sensing coils; wherein the tracking module enables tracking of the position and orientation of the hand controller via magnetic field data sensed by the magnetic sensing coils at a first sampling interval in response to a magnetic field generated by the magnetic field generator, the magnetic field data associated with sampling times based on the sampling interval; wherein the input control data transmitted by the wireless communication module further comprises the magnetic field data; wherein the hand controller further comprises an inertial measurement unit; wherein data of the inertial measurement unit is used to enhance interpolation of magnetic field data to generate interpolated position and orientation data associated with times between the sampling times.

2. The system of claim 1, wherein the hand controller further comprises a side button, fixed to the left face of the ergonomic chassis, configured such that the side button is operable by the thumb of the right hand; wherein the side button and joystick are positioned relative to each other such that the thumb may move from the side button to the joystick without repositioning any of the index finger, the middle finger, the ring finger, and the pinky finger of the right hand.

3. The system of claim 1, wherein the lower lever outputs a lower lever signal in response to actuation of the lower lever; wherein the lower lever signal is used to estimate a grip strength of the user.

4. The system of claim 3, wherein the lower lever is hinged such that such that the lower lever may be actuated by either of the middle finger contracting a first actuation distance and the pinky finger contracting a second actuation distance; wherein the first actuation distance is larger than the second actuation distance.

5. The system of claim 1, wherein the base unit further comprises a charging interface configured to charge a battery of the hand controller when the hand controller is docked to the base unit.

6. The system of claim 1, wherein the base unit includes a hand controller docking interface; wherein the magnetic sensing coils in the hand controller have a known and constant position and orientation relative to the magnetic field generator in the base unit when docked to the hand controller docking interface; wherein the known and constant position and orientation is used, along with the magnetic field data sensed by the magnetic sensing coils, to calibrate position of the magnetic sensing coils.

7. The system of claim 6, wherein the base unit further comprises a charging interface configured to charge a battery of the hand controller concurrently with the calibration of the position of the magnetic sensing coils when the hand controller is docked to the base unit; wherein calibration of the position of the magnetic sensing coils is performed automatically in response to detection of a controller docking event.

8. The system of claim 1, further comprising an optical tracking system; wherein the optical tracking system tracks optical position and orientation data of the hand controller; wherein the optical position and orientation data is used to calibrate the magnetic field data.

9. The system of claim 8, wherein calibration of the magnetic field data is based on historical optical position and orientation data associated with a detected position and orientation of the optical tracking system relative to the magnetic field generator.

10. The system of claim 1, wherein the hand controller further comprises an inertial measurement unit; wherein data of the inertial measurement unit is used to correct the magnetic field data in real-time.

11. The system of claim 1, wherein the hand controller further comprises a haptic feedback module.

12. The system of claim 11, wherein the lower lever outputs a lower lever signal in response to actuation of the lower lever; wherein the haptic feedback module provides haptic feedback in response to the lower lever signal exceeding a threshold actuation.

13. The system of claim 12, wherein the lower lever signal is used to estimate a grip strength of the user; wherein a haptic feedback magnitude of the haptic feedback is directly proportional to the grip strength.

14. The system of claim 1, further comprising a body tracker, the body tracker including a second set of orthogonal magnetic sensing coils, wherein magnetic field data sensed by the body tracker is used to correct the magnetic field data sensed by the hand controller in real-time based on a known positioning of the body tracker on the user.

15. The system of claim 1, further comprising a computing system, physically distinct from the base unit, coupled to the base unit via an electric cable; wherein power and data are transferred between the computing system and the base unit via the electric cable.

16. The system of claim 15, wherein the magnetic field generator is controlled by the computing system.

17. A system for natural motion interaction with a virtual environment comprises:

a hand controller, configured to be held in a right hand of a user, the hand controller comprising:

a rigid ergonomic chassis comprising a front, a back, a right face, a left face, and a bottom;

a hand strap, coupled to the right face of the ergonomic chassis, configured to strap to the back of the right hand, such that the ergonomic chassis remains coupled to the right hand when strapped regardless of user hand configuration;

a main trigger, fixed to the front of the rigid ergonomic chassis, configured such that the main trigger is operable by an index finger of the right hand;

a lower lever, fixed to the front of the rigid ergonomic chassis and below the main trigger;

a joystick, fixed to the back of the rigid ergonomic chassis, configured such that the joystick is operable by a thumb of the right hand;

a tracking module, fixed to the rigid ergonomic chassis, that enables tracking of a position and orientation of the hand controller;

a wireless communication module, fixed to the rigid ergonomic chassis, that transmits input control data responsive to input of the user at the main trigger, the lower lever, and the joystick;

a base unit, the base unit physically distinct from the hand controller and including a magnetic field generator; and a body tracker including a body tracker inertial measurement unit, wherein body tracker inertial measurement unit data is used to correct the magnetic field data in real-time based on a known positioning of the body tracker on the user and to enhance the interpolation of the magnetic field data;

wherein the tracking module comprises a set of orthogonal magnetic sensing coils; wherein the tracking module enables tracking of the position and orientation of the hand controller via magnetic field data sensed by the magnetic sensing coils at a first sampling interval in response to a magnetic field generated by the magnetic field generator, the magnetic field data associated with sampling times based on the sampling interval; wherein the input control data transmitted by the wireless communication module further comprises the magnetic field data; wherein the controller inertial measurement unit samples the controller inertial measurement unit data at a second sampling interval distinct from the first sampling interval, and wherein the body tracker inertial measurement unit samples the body tracker inertial measurement unit data at a third sampling interval distinct from the first sampling interval.

* * * * *

UNITED STATES PATENT AND TRADEMARK OFFICE
CERTIFICATE OF CORRECTION

PATENT NO. : 9,746,933 B2
APPLICATION NO. : 15/152035
DATED : August 29, 2017
INVENTOR(S) : Nathan Burba et al.

Page 1 of 1

It is certified that error appears in the above-identified patent and that said Letters Patent is hereby corrected as shown below:

On the Title Page

Item (72) Inventors: "Umez Liauwala, Culver City, CA (US);" should read "Umez Lilauwala, Culver City, CA (US);"

Signed and Sealed this
Twenty-seventh Day of August, 2019

Andrei Iancu
*Director of the United States Patent and Trademark Office*